United States Patent Office 3,401,013
Patented Sept. 10, 1968

3,401,013
PROCESS FOR THE MANUFACTURE OF METAL FLUOROPHOSPHATES
Hans Adolf Rohlfs and Heinz Schmidt, Wiesbaden-Biebrich, Germany, assignors to Chemische Werke Albert, Wiesbaden-Biebrich, Germany, a corporation of Germany
No Drawing. Filed Feb. 8, 1966, Ser. No. 525,844
Claims priority, application Germany, Dec. 23, 1965, C 37,747
11 Claims. (Cl. 23—107)

ABSTRACT OF THE DISCLOSURE

Process for the manufacture of metal fluorophosphates and products containing them comprising reacting at a temperature of about 140 to 600° C. (A) phosphoric acid, an ammonium phosphate, a metal phosphate or an adduct of a phosphoric acid and nitrogen-containing compounds delivering ammonia at said temperature with (B) hydrofluoric acid, hydrogen fluoride, an ammonium fluoride or a metal fluoride, and, at least where the starting materials (A) and (B) contain an insufficient amount of metal equivalents to comply with the desired ratio of metal equivalents to phosphorus atoms, (C) at least one basic reacting compound.

---

Various metal fluoro-orthophosphates and processes for preparing them are known. Thus, for example disodium monofluorophosphate is obtained by melting sodium fluoride and sodiumtrimetaphosphate together at 700–800° C. for a short time. Ammonium monofluorophosphate or ammonium difluorophosphate respectively is formed by reacting phosphorus pentoxide with ammonium fluoride. Phosphorus pentachloride reacts with alkali metal fluorides while forming alkali metal hexafluorophosphate and alkali metal chloride.

Further, a number of compounds is known which are formed by the addition of hydrogen fluoride to neutral or acidic phosphates of the alkali metals. Thus, a salt of the formula $KH_2PO_4 \cdot HF$ is obtained by dissolving the residue obtained by evaporation of an aqueous solution of one mol of tripotassium phosphate and one mol of potassium hydroxide in an excess 40% aqueous hydrofluoric acid, concentrating while gently warming, e.g. below 100° C., and subsequently cooling. The yield is only about 15%. If the solution is evaporated too much and the precipitated salt mixture is then dissolved in hydrofluoric acid, the said salt is no longer obtained by concentration. Later authors have shown that, when reacting salts of phosphoric acid, e.g. mono-potassium phosphate, with 41% aqueous hydrofluoric acid at a temperature below 120° C. ions of monofluoro phosphate are formed in an amount reaching a limit, if increasing amounts of hydrofluoric acid are used. This limit is attained at a ratio of 0.69 mol of $H_3PO_4$, 0.31 mol of $H_2PO_3F$ and 91.2 mols of HF. In spite of the enormously high excess of hydrofluoric acid, however, only an about 30% conversion of the phosphate is observed.

It has now surprisingly been found that fluorophosphates of metals and/or ammonium or products containing them respectively, in which the ratio of metal equivalents—which term is used also to cover the ammonium equivalents—to phosphorus atoms is (0.7–2.5):1, that of phosphorus to fluorine bound to phosphorus is 1:(0.5–2), that of phosphorus to the total fluorine is 1:(0.5–3) and that of fluorine bound to phosphorus to the total fluorine is (0.5–1):1, preferably (0.8–1):1, may be obtained at temperatures between 140 and 800° C. in a very good, often 100% yield, if (A) phosphoric acids and/or phosphates and/or phophoric acid-adducts are reacted with (B) hydrofluoric acid and/or fluorides and—at least where the starting materials (A) and (B) do not contain a sufficient amount of metal equivalents—(C) at least one basic reacting compound. In the metal fluorophosphates or mixtures containing them used in the process the ratio of metal equivalents to phosphorus atoms to fluorine—which is preferably bound to phosphorus—is preferably (1–2):1:(0.9–2). In the starting mixtures the atomic ratio of phosphorus to fluorine shall be at most 1:0.5, preferably 1:(1–8), but it may also be smaller, e.g. 1:12 or eventually even 1:20. Furthermore at least one hydrogen atom having an acid function shall be present for each two phosphorus atoms, which hydrogen atom may either be derived from the phosphate or fluoride component. If no or insufficient amounts of metal salts are contained in the starting mixture, bases have to be added in such an amount that the ratio of metal equivalents to phosphorus is (0.7–2.5):1, preferably (1–2):1.

The reaction may be carried out in closed or open vessels. Mostly one operates at ordinary pressure, but it is also possible to operate at elevated or reduced pressure, particularly if no free hydrofluoric acid or no free phosphoric acid is used. The reaction temperature is also dependent on the nature of the reactants and the desired products. It is preferably between 170 and 600° C. The reaction of acidic phosphates of alkali metals, ammonium and/or alkaline earth metals, i.e. of the monohydrogen- and dihydrogen phosphates with hydrofluoric acid, i.e. the aqueous solution of hydrogen fluoride, is preferably carried out at about 170 to 300° C., the reaction of neutral salts of orthophosphoric acid or of polyphosphates respectively with hydrofluoric acid between about 200 and 400° C. and the reaction of acidic alkali metal or ammonium phosphates with fluorides or silico fluorides respectively at 400–800° C. If temperatures are used higher than those necessary for the reaction, the fluorine content of the reaction product may be reduced, which generally is not desired.

As suitable starting materials there are mentioned for example aqueous phosphoric acid having a $H_3PO_4$-content of at least 15% by weight, preferably at least 50% by weight, crystallized phosphoric acid and polyphosphoric acids, which also may be produced from phosphorus pentoxide and water immediately before the reaction. Suitable phosphates are the primary, secondary and tertiary salts of ammonium, alkali metals, alkaline earth metals and other metals, e.g. metal-(III)-salts of orthophosphoric acid, such as sodium or potassium dihydrogen phosphate, disodium or dipotassium hydrogen phosphate, trisodium or tripotassium phophate, monoammonium and diammonium orthophosphate, monocalcium and dicalcium orthophosphate, monomagnesium and dimagnesium orthorphosphate, acidic or neutral iron or aluminum phosphate, or also phopshates of other metals, e.g. of cobalt, nickel, manganese and zinc. The phosphoric acid may also be used in the form of adducts, which deliver ammonia when heated, such as urea phosphate or hydrazine phosphate. There are also suitable acidic and respectively or neutral salts of poly- or metaphosphoric acids respectively, e.g. $Na_2H_2P_2O_7$, $Na_4P_2O_7$, $Na_6P_3O_{10}$, $(NaPO_3)_3$, Graham salt, Kurrol salt etc.

Suitable fluorine-containing compounds are for example undiluted or diluted hydrofluoric acid having a content of at least 15, preferably at least 40% by weight of HF or fluorides such as alkali-, alkaline earth or other metal-, e.g. metal-(III)-fluorides, the expression "fluorides" also embracing complex fluorides such as silicofluorides. In detail there are mentioned: HF, NaF, $NaF \cdot HF$, KF, $KF \cdot 2HF$, $NH_4F$, $NH_4F \cdot HF$, $CaF_2$, $MgF_2$, $AlF_3$, $Na_2SiF_6$, $MgSiF_6$, $Na_3AlF_6$. Thus, the present process is extraordinarily variable with regard to the fluorine-containing starting compounds. The phosphates and fluorides may be used in the form of water-containing products such as crystallized, or preferably anhydrous products.

As bases there are suitable for example the hydroxides of the above-said metals or basic salts or such salts, the acid component of which, such as carbon dioxide, escapes under the reaction conditions.

As has further been found nitrogen-containing compounds which form adducts with phosphoric acid, or compounds being equivalent to them respectively, may also be used with special advantage. These compounds may be employed in free form, i.e. as base, as well with free phosphoric acid or the phosphoric acid adducts as also together with the phosphates. Additionally to their basic effect, these substances have still an almost catalytic effect, by binding the water formed or present respectively in the reaction mixture by being hydrolyzed themselves. Moreover, the gaseous cleavage products thus formed effect an improved mixing of the reaction mixture and an improved removal of an excess of water which may perhaps be present.

As suitable basic nitrogen-containing substances there may be mentioned compounds of the general formulae:

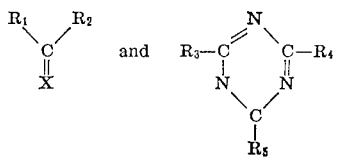

X means therein an oxygen atom, sulfur atom or the NH-group, $R_1$ hydrogen, an alkyl-, alkoxy- or acid amide radical having up to 3 carbon atoms (e.g. —$CONH_2$) or a —$NH_2$-, —NH—$NH_2$- or

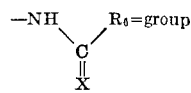

$R_2$ a $NH_4$-, $SNH_4$- or $ONH_4$-group, $R_3$, $R_4$ and $R_5$, an OH- or $NH_2$-group, $R_6$ hydrogen, alkyl-, alkoxy or acid amide radical having up to 3 carbon atoms or an $NH_2$- or —NH—$NH_2$-group. $R_1$ or $R_6$ on the one hand and X on the other hand may together also be a nitrogen atom. Suitable nitrogen-containing compounds are for example acid amides of mono- or polycarboxylic acids, such as formamide, oxamide, acetamide, biuret, semicarbazide, dicyandiamide, urea, thiourea, guanidine, urethanes, such as ethyl urethane, cyanuric acid, the melamine, ammeline or ammelide. A compound, in which X and $R_1$ are combined to a substituent, is for example the cyanamide. The use of urea is preferred.

The nitrogen-containing compound is generally added in an amount which is at most as high that the atomic ratio of the nitrogen bound therein to the phosphorus is not greater than 5:1 and preferably (0.3–3):1. The ammonia formed therefrom may partially or completely be bound by the fluorophosphates formed. Further, it is of course possible to collect the gaseous reaction products which become free, and, if they contain ammonium fluoride, they may be used again as fluorine component for the present reaction if desired after further working up procedure.

When using nitrogen-containing basic substances attention has to be drawn to the fact that the best reaction temperature is also influenced by the differentiated decomposability of these substances. Thereby, it may under certain circumstances be suitable to carry out the reaction at elevated or especially at reduced pressure. When using phosphoric acid or acidic phosphates respectively the acid groups are already present. When using neutral salts of phosphoric acid, such as $K_3PO_4$, $Na_4P_2O_7$, $Na_5P_3O_{10}$ the acid groups have to be delivered in another manner, e.g. by the addition of phosphoric acid or hydrofluoric acid or by hydrolysis effected during the course of the reaction by the water contained in the hydrofluoric acid. According to the invention, the most various products, e.g. also those having mixed cations may be obtained, dependent on the kind and the amount of the starting materials, the reaction conditions, such as temperature and time. As far as the requirements of the end products permit, there may also be reacted mixtures of two or more compounds of each of the reaction components instead of a single compound.

The fluorine phosphates obtained according to the invention are suitable for example as fluorine carrier in tooth pastes or drinking water.

EXAMPLES

The reaction conditions and results of Examples 1 to 21 are summarized in the following table.

| Example | Batch | Reaction conditions | | G. | Percent total $P_2O_5$ | Reaction Product Percent of total $P_2O_5$ as— | |
|---|---|---|---|---|---|---|---|
| | | Hours | °C. | | | Mono-$P_2O_5$ | Di-$P_2O_5$ |
| 1 | 19.6 g. of cryst. $H_3PO_4$, 8.4 g. of NaF | 1 | 200 | 24.7 | 56.6 | 85.9 | 14.1 |
| 2 | 19.6 g. of cryst. $H_3PO_4$, 16.8 g. of NaF | 1 | 400 | 29.1 | 48.4 | 88.7 | |
| 3 | 19.6 g. of cryst. $H_3PO_4$, 23.2 g. of KF | 1 | 400 | 35.4 | 40.0 | 97.0 | 1.0 |
| 4 | 34.0 g. of $KH_2PO_4$, 25.0 g. of HF (40%) | 2 | 220 | 41.4 | 48.4 | 100.0 | |
| 5 | 31.6 g. of ureaphosphate, 11.6 g. of KF | 1 | 200 | 30.3 | 46.7 | 100.0 | |
| 6 | 31.6 g. of ureaphosphate, 8.4 g. of NaF | 1 | 200 | 26.3 | 52.3 | 100.0 | |
| 7 | 28.5 g. of $NH_4H_2PO_4$, 62.5 g. of HF (40%) | 2 | 220 | 30.1 | 56.5 | 100.0 | |
| 8 | 31.6 g. of ureaphosphate, 100 g. of HF (40%) | 1 | 300 | 21.6 | 63.0 | 100.0 | |
| 9 | 43.5 g. of $K_2HPO_4$, 63.0 g. of HF (40%) | 2 | 220 | 51.0 | 31.8 | 100.0 | |
| 10 | 34.8 g. of $K_2HPO_4$, 50.0 g. of HF (40%) | 2 +1 | 220 400 | 33.9 | 38.2 | 100.0 | |
| 11 | 35.6 g. of $Na_2HPO_4 \cdot 2H_2O$, 50.0 g. of HF (40%) | 2 +1 | 220 800 | 27.0 | 48.8 | 83.4 | 15.0 |
| 12 | 58.5 g. of prim. Ca-phosphate, 63.0 g. of HF (40%) | 3 | 220 | 55.9 | 58.5 | 100.0 | |
| 13 | 54.6 g. of prim. Mg-phosphate, 63.0 g. of HF (40%) | 2 | 220 | 56.6 | 53.0 | 100.0 | |
| 14 | 26.4 g. of $(NH_4)_2HPO_4$, 50.0 g. of HF (40%) | 2 | 220 | 29.5 | 48.2 | 100.0 | |
| 15 | 53.2 g. of $Na_4P_2O_7$, 50.0 g. of HF (40%) | 2 +1 | 220 400 | 58.2 | 48.8 | 79.0 | 2.3 |
| 16 | 60.0 g. of $NaH_2PO_4$, 47.0 g. of $Na_2SiF_6$ | 2 | 700 | 69.8 | [1]47.6 | 100.0 | |
| 17 | 19.6 g. of cryst. $H_3PO_4$, 12.0 g. of urea, 16.8 g. of NaF | 2 | 400 | 28.6 | 47.4 | 94.0 | 4.0 |
| 18 | 24.0 g. of $NaH_2PO_4$, 8.4 g. of NaF, 6.0 g. of urea | 1 | 500 | 27.8 | 48.7 | 85.0 | 10.0 |
| 19 | 24.0 g. of $NaH_2PO_4$, 8.4 g. of NaF, 12.0 g. of urea | 2 | 500 | 28.2 | 47.0 | 90.0 | 6.0 |
| 20 | 24.0 g. of $NaH_2PO_4$, 8.4 g. of NaF, 7.6 g. of thiourea | 1 | 500 | 28.6 | 48.7 | 91.0 | 6.0 |
| 21 | 23.0 g. of $NH_4H_2PO_4$, 16.8 g. of NaF, 18.0 g. of formamide | 1 | 500 | 27.4 | 47.3 | 95.0 | 4.0 |

[1] 0.006% $SiO_2$.

| Tri-P$_2$O$_5$ | Higher condensed P$_2$O$_5$ condensed | Percent F | Percent Me$_2$O or MeO respect. | Percent total-N | Molar ratio MeI:P:F[1] |
|---|---|---|---|---|---|
| | | 8.75 | 24.8 | | 1.00:1:0.58 |
| 0.8 | 10.5 | 14.6 | 43.2 | | 2.04:1:1.127 |
| 1.0 | 1.0 | 12.1 | 51.9 | | 1.95:1:1.13 |
| | | 13.0 | 33.8 | | 1.05:1:1.00 |
| | | 12.4 | 30.9 | [2] 8.1 | 1.88:1:1.01 |
| | | 14.0 | 23.4 | [2] 8.3 | 1.83:1:1.00 |
| | | 16.0 | | [2] 11.7 | 1.05:1:1.06 |
| | | 17.8 | | [2] 11.6 | 0.94:1:1.06 |
| | | 24.9 | 41.8 | | [3] 1.98:1:2.93 |
| | | 12.4 | 50.0 | | 1.97:1:1.21 |
| 1.6 | | 10.7 | 44.6 | | 2.09:1:0.82 |
| | | 11.9 | 18.1 | | 0.784:1:0.76 |
| | | 9.1 | 15.6 | | 1.04:1:0.64 |
| | | 23.7 | | 15.5 | 1.64:1:1.81 |
| 2.7 | 16.0 | 13.4 | 41.4 | | 1.94:1:1.03 |
| | | 11.9 | 41.4 | | 1.99:1:0.94 |
| 2.0 | | 12.1 | 43.0 | | 2.08:1:0.96 |
| 5.0 | | 11.5 | 43.4 | | 2.04:1:0.88 |
| 4.0 | | 11.8 | 42.7 | 0.14 | 2.08:1:0.94 |
| 3.0 | | 12.0 | 42.6 | Traces | 2.00:1:0.92 |
| 1.0 | | 12.0 | 42.7 | | 2.07:1:0.95 |

[1] MeI=Metal equivalent.
[2] As NH$_3$-N.
[3] Probably an equimolecular mixture of KF and KPO$_2$F$_2$.

What we claim is:

1. A process for the manufacture of metal fluorophosphates and products containing them in which the atomic ratios are: (I) metal equivalents to phosphorus atoms (0.7–2.5):1, (II) phosphorus to fluorine bound to phosphorus 1:(0.5–2), (III) phosphorus to the total fluorine 1:(0.5–3) and (IV) fluorine bound to phosphorus to the total fluorine is (0.5–1):1 which process comprises reacting at a temperature of about 140 to 600° C. (A) at least one compound selected from the group consisting of phosphoric acids, ammonium phosphates, metal phosphates and adducts of phosphoric acids and nitrogen-containing compounds delivering ammonia at said temperature with (B) at least one compound selected from the group consisting of hydrofluoric acid, hydrogen fluoride, ammonium fluorides and metal fluorides, and, at least where the starting materials (A) and (B) contain an insufficient amount of metal equivalents to comply with the said ratio of metal equivalents to phosphorus atoms, (C) at least one basic reacting compound, the atomic ratio of phosphorus to fluorine in the starting materials being at most 1 to 0.5 and the ratio of metal equivalents to phosphorus therein being (0.7–2.5):1, and at least one acidic hydrogen atom being present in the reactants for each two phosphorus atoms contained therein.

2. A process as claimed in claim 1 wherein a fluoride is reacted with phosphoric acid at a temperature in the range of about 200 to 400° C.

3. A process as claimed in claim 1, wherein at least one phosphate of ammonium, an alkali metal or an alkaline earth metal which contains at least one hydrogen atom for every phosphorus atom is reacted with hydrofluoric acid at a temperature in the range from 170 to 300° C.

4. A process as claimed in claim 1, wherein a neutral phosphate or a polyphosphate is reacted with hydrofluoric acid at a temperature in the range from 200 to 400° C.

5. A modification of the process claimed in claim 1, wherein an alkali metal phosphate or an ammonium phosphate, both of which contain at least one hydrogen atom for every phosphorus atom, is reacted with a silico fluoride at a temperature in the range from 400 to 800° C.

6. A process as claimed in claim 1, wherein the atomic ratio from phosphorus to fluorine in the starting material is 1:(1–8) and the ratio from metal equivalents to phosphorus is (1–2):1.

7. A process as claimed in claim 1, wherein an anhydrous starting material is reacted.

8. A process as claimed in claim 1, wherein the reaction is carried out at ordinary pressure.

9. A process as claimed in claim 1, wherein the nitrogen-containing compound is selected from the group consisting of adducts of phosphoric acid with a nitrogen containing compound as defined below and a nitrogen containing compound having the formula

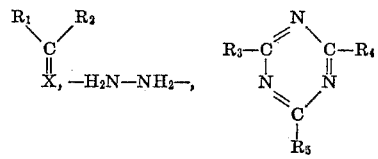

in which X is a member selected from the group consisting of oxygen, sulphur and the NH-group, R$_1$ is a member selected from the group consisting of hydrogen, an alkyl radical, an alkoxy radical, an acid amide group, a NH$_2$-group, a NH—NH$_2$-group and a

R$_2$ is a member selected from the group consisting of an NH$_2$-group, a SNH$_4$-group and an ONH$_4$-group, R$_3$, R$_4$ and R$_5$ each represent radicals selected from the group consisting of OH-groups and NH$_2$-groups and R$_6$ is a radical selected from the group consisting of hydrogen, an alkyl group, an alkoxy group, an acid amide group, a NH$_2$-group and a NH—NH$_2$-group, the alkyl, alkoxy and acid amide groups of radicals R$_1$ and R$_6$ each having not more than 3 carbon atoms, and in which either of radicals R$_1$ and R$_6$ on the one hand and X on the other hand may also be combined to a single nitrogen atom, the amount of the said nitrogen-containing compound being such that the atomic ratio of the nitrogen bound therein to the phosphorus is not greater than 5:1.

10. A process as claimed in claim 9, wherein the atomic ratio of the nitrogen bound in said nitrogen-containing compound to phosphorus is (0.3–3):1.

11. A process as claimed in claim 10, wherein the nitrogen-containing compound as specified in claim 9 is urea.

No references cited.

OSCAR R. VERTIZ, *Primary Examiner.*

L. A. MARSH, *Assistant Examiner.*